US012590486B2

(12) United States Patent
Silvestrini

(10) Patent No.: US 12,590,486 B2
(45) Date of Patent: Mar. 31, 2026

(54) METHOD FOR MANUFACTURING A SLIDING GLAZING UNIT, AND SLIDING GLAZING UNIT

(71) Applicant: SAINT-GOBAIN GLASS FRANCE, Courbevoie (FR)

(72) Inventor: Laurent Silvestrini, Bussy (FR)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 133 days.

(21) Appl. No.: 18/559,262

(22) PCT Filed: Apr. 27, 2022

(86) PCT No.: PCT/FR2022/050800

§ 371 (c)(1),
(2) Date: Nov. 6, 2023

(87) PCT Pub. No.: WO2022/234216

PCT Pub. Date: Nov. 10, 2022

(65) Prior Publication Data

US 2024/0240504 A1 Jul. 18, 2024

(30) Foreign Application Priority Data

May 7, 2021 (FR) ....................................... 2104862

(51) Int. Cl.
*E05F 11/38* (2006.01)

(52) U.S. Cl.
CPC ....... *E05F 11/385* (2013.01); *E05Y 2600/526* (2013.01); *E05Y 2800/676* (2013.01); *E05Y 2900/55* (2013.01)

(58) Field of Classification Search
CPC ................ E05F 11/385; E05F 15/6892; E05Y 2600/526
See application file for complete search history.

(56) References Cited

U.S. PATENT DOCUMENTS 4,663,901 A * 5/1987 Ichinohe .................... B60J 1/17 52/716.5
4,762,904 A * 8/1988 Nakama ..................... B60J 1/17 52/716.5

(Continued)

FOREIGN PATENT DOCUMENTS

JP JP 2003-328640 A 11/2003
JP DR JP 5071075 B2 11/2012

(Continued)

OTHER PUBLICATIONS

International Search Report as issued in International Patent Application No. PCT/FR2022/050800, dated Sep. 20, 2022.

*Primary Examiner* — Michael N Orlando
*Assistant Examiner* — John Blades
(74) *Attorney, Agent, or Firm* — Cushman Partners, LLC

(57) ABSTRACT

A method for manufacturing a glazed unit, including a glass pane having an external face, an internal face and a peripheral edge, and an attachment system to allow mobility of the glass pane in vertical translation with respect to a door of a vehicle, the attachment system being located in an attachment zone and including a window holder having a U-shaped part, wherein the attachment system is attached to the glass pane by positioning the glass pane on a reference housing, then, applying an adhesive and positioning the window holder opposite a rim of the glass pane such that the adhesive is positioned in the U-shaped part, between the glass pane and the window holder, and the window holder having a lateral extension, distinct from the U-shaped part and located opposite the glass pane, applying a quick-hardening plastic material is applied on a lateral extension, and/or under a lateral extension.

23 Claims, 6 Drawing Sheets

(56) References Cited

U.S. PATENT DOCUMENTS

| | | | | |
|---|---|---|---|---|
| 2003/0019093 | A1* | 1/2003 | Bohannan .................. | B60J 1/17 29/559 |
| 2009/0072579 | A1 | 3/2009 | Mori | |
| 2017/0284140 | A1 | 10/2017 | Sase | |
| 2020/0048949 | A1 | 2/2020 | Walawender et al. | |
| 2022/0185078 | A1* | 6/2022 | Wakabayashi ........ | E05F 11/385 |

FOREIGN PATENT DOCUMENTS

| | | | |
|---|---|---|---|
| WO | WO 2005/098187 | A1 | 10/2005 |
| WO | WO 2008/074819 | A1 | 6/2008 |

* cited by examiner

[Fig. 1]
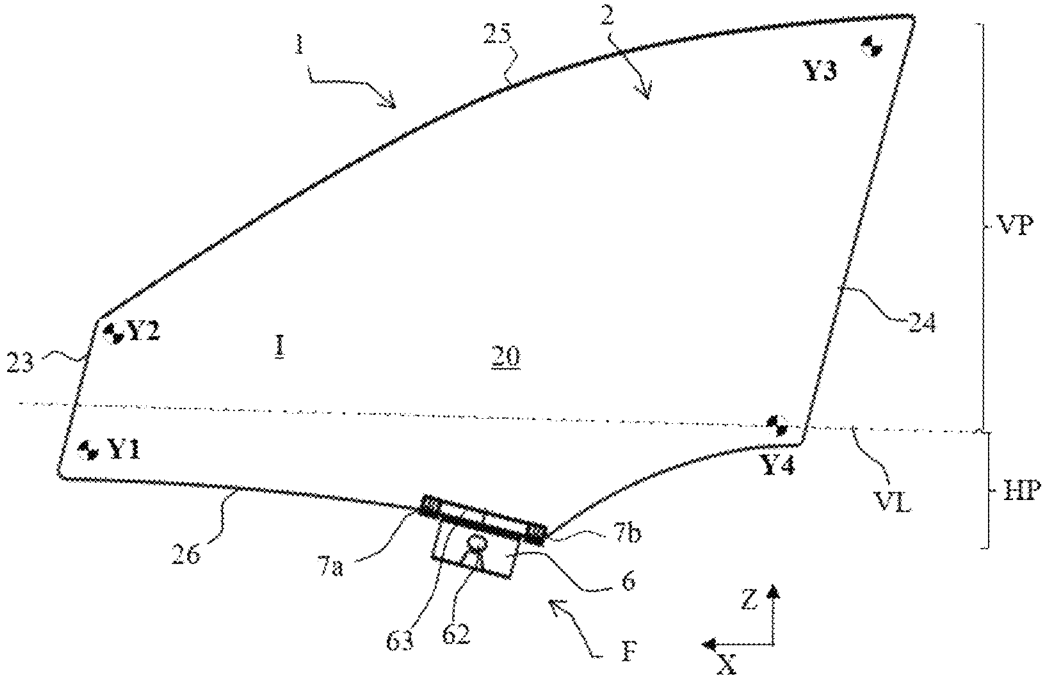
[Fig. 2]
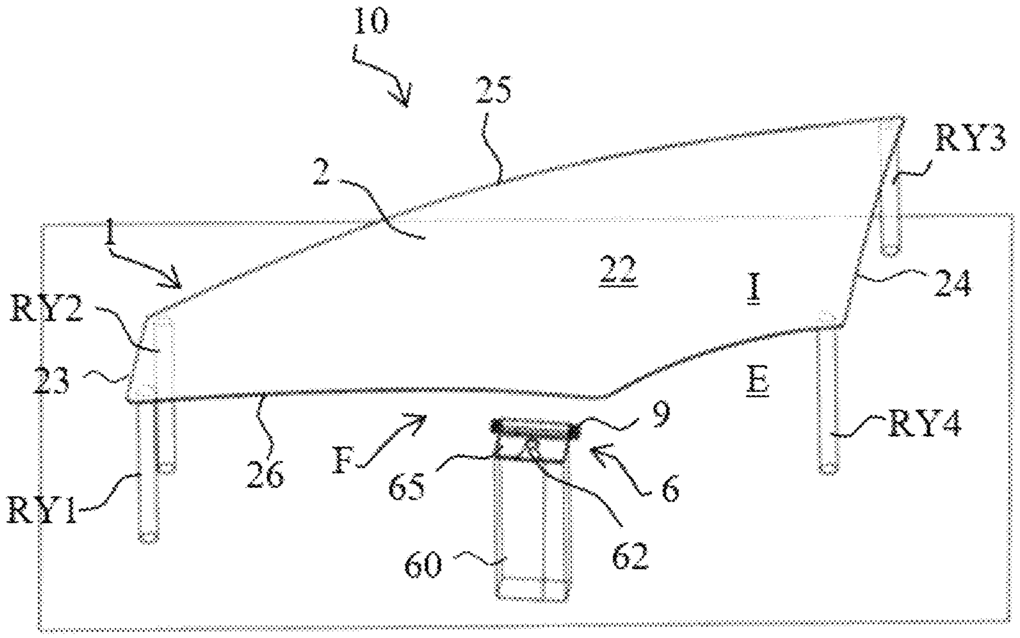

[Fig. 3]
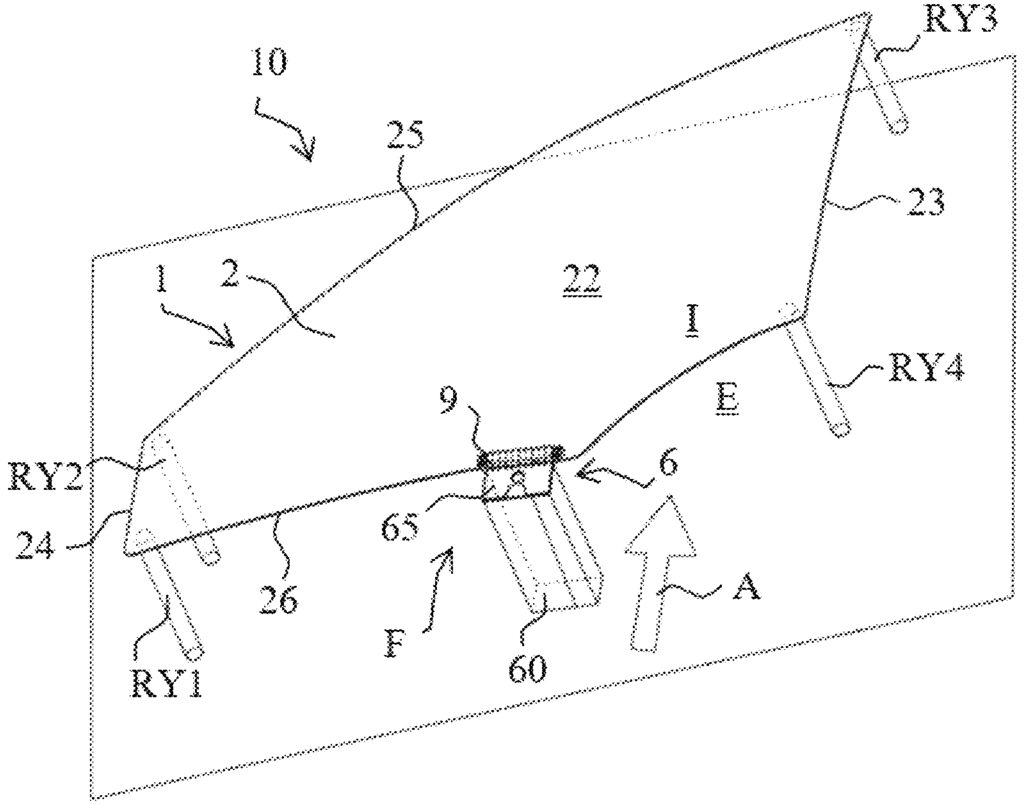
[Fig. 4]
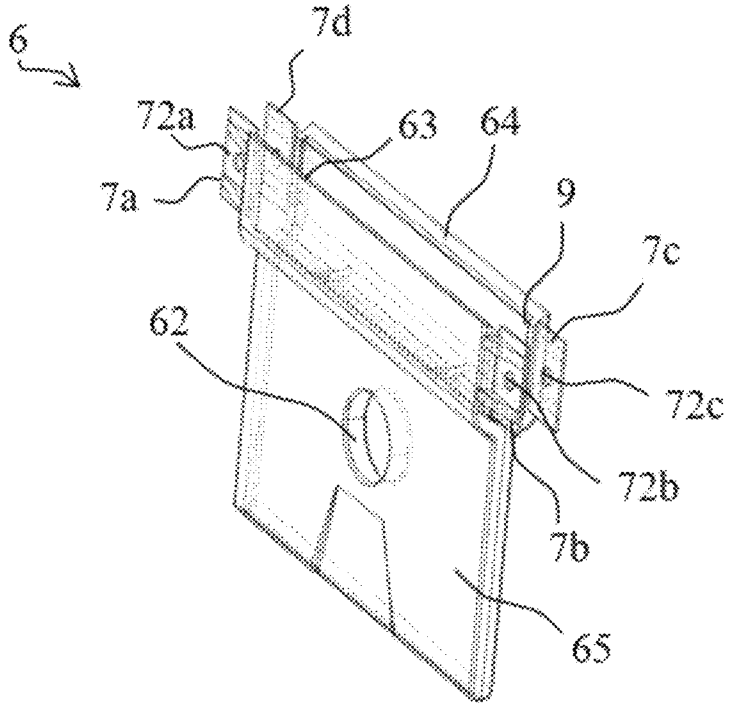

[Fig. 5]
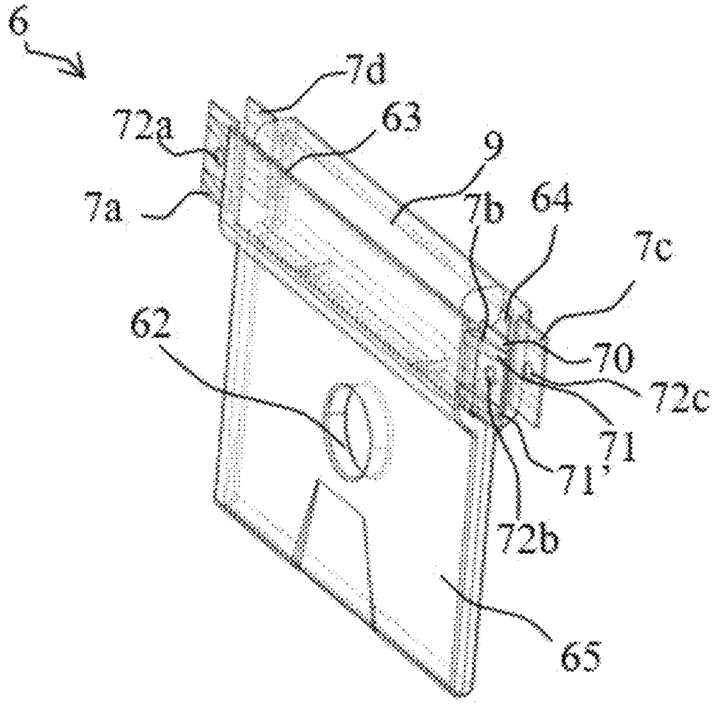
[Fig. 6]
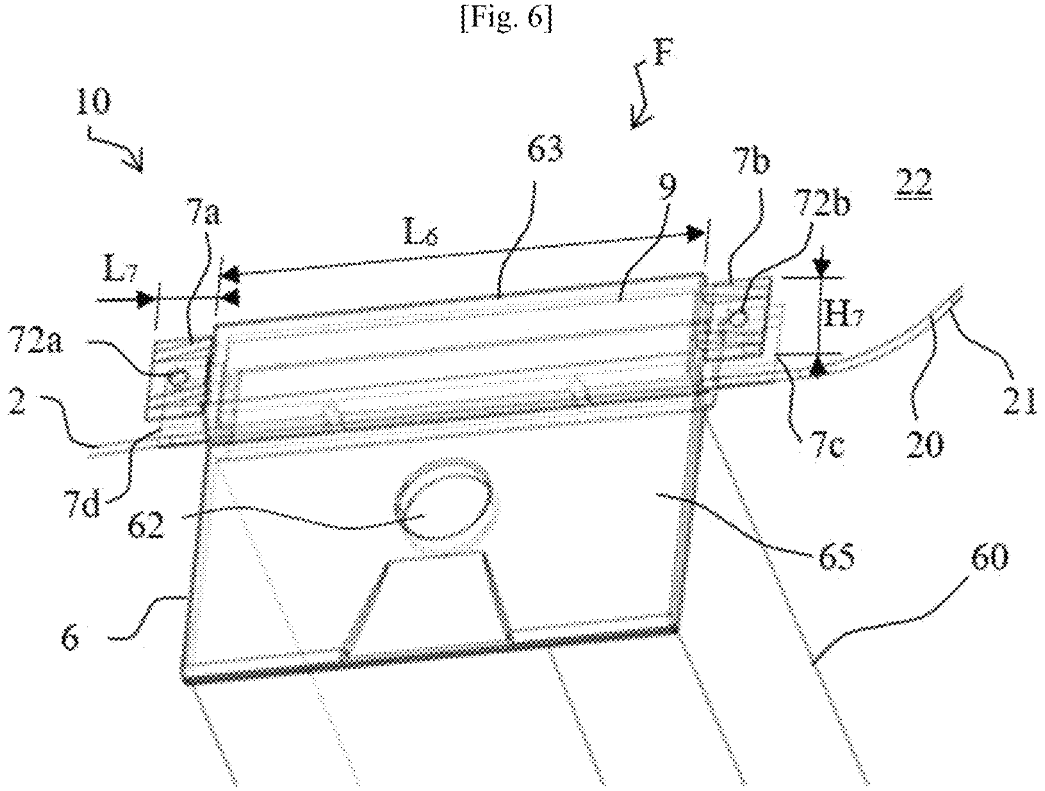

[Fig. 7]
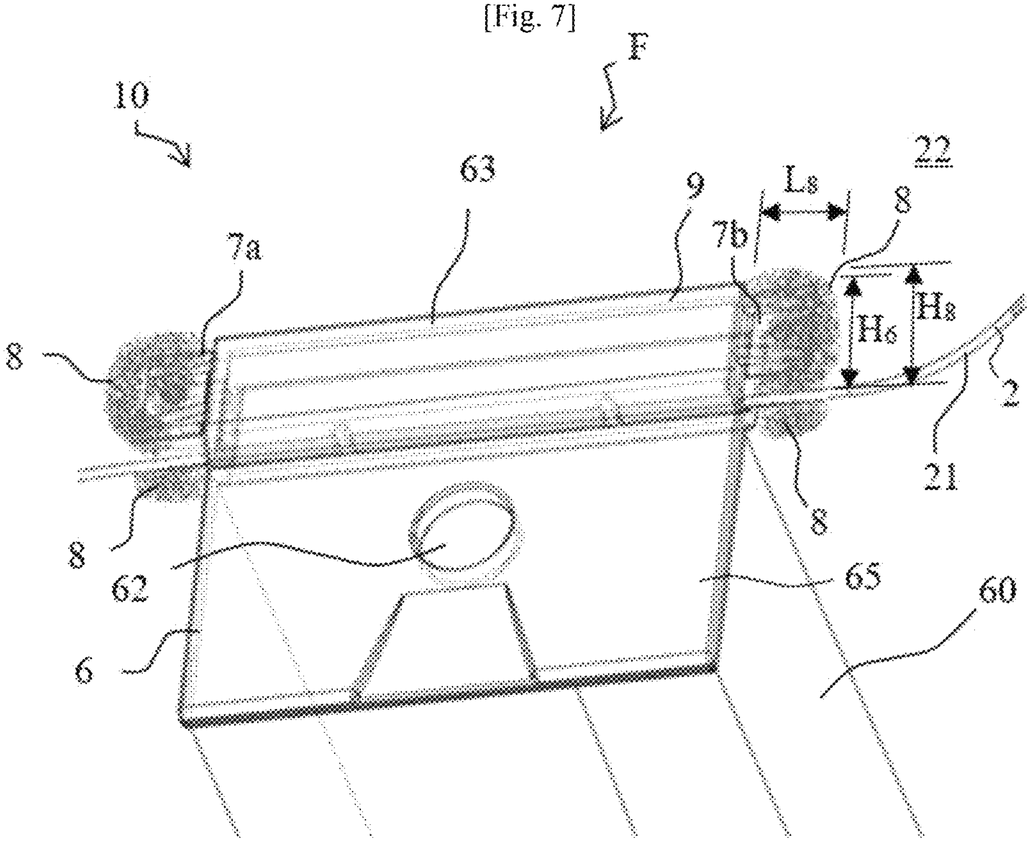
[Fig. 8]
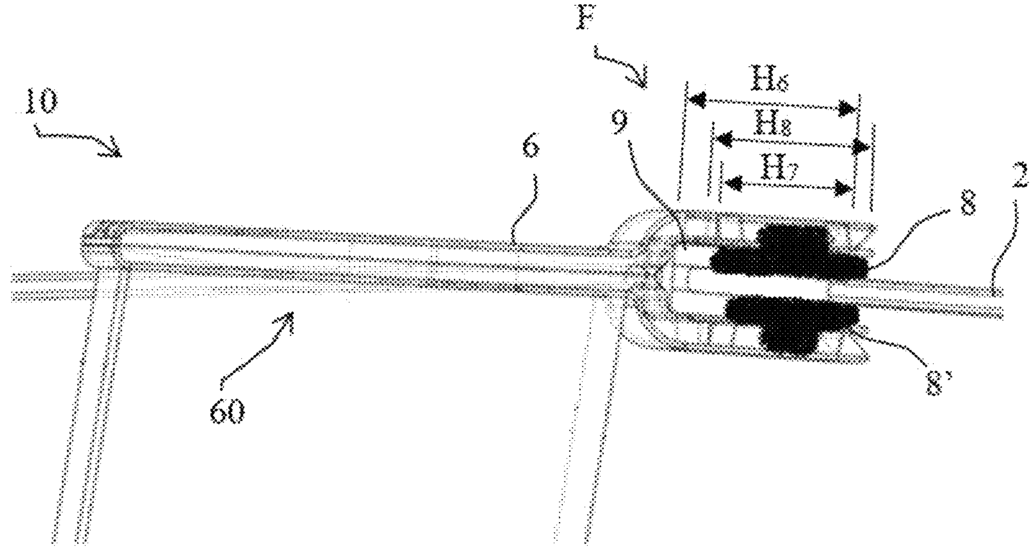

[Fig. 9]
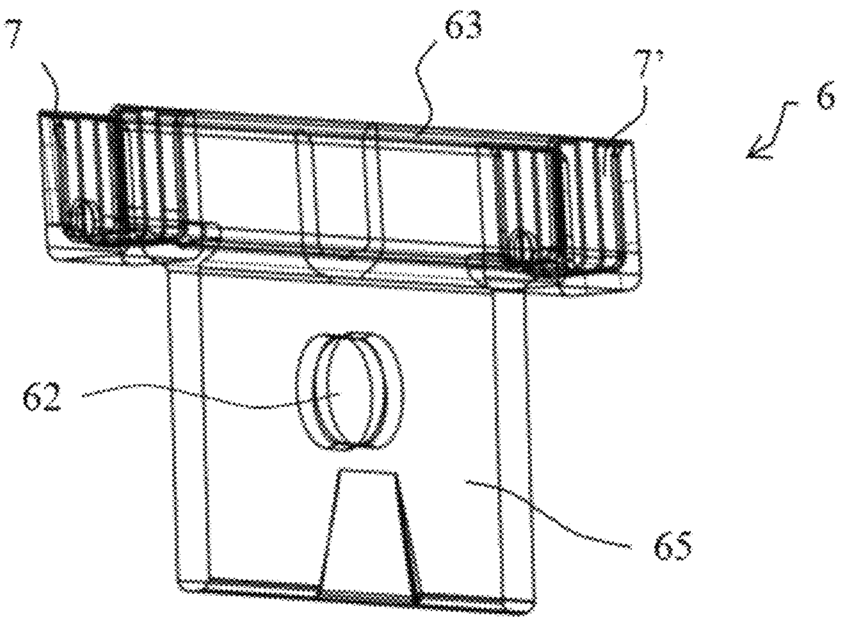
[Fig. 10]
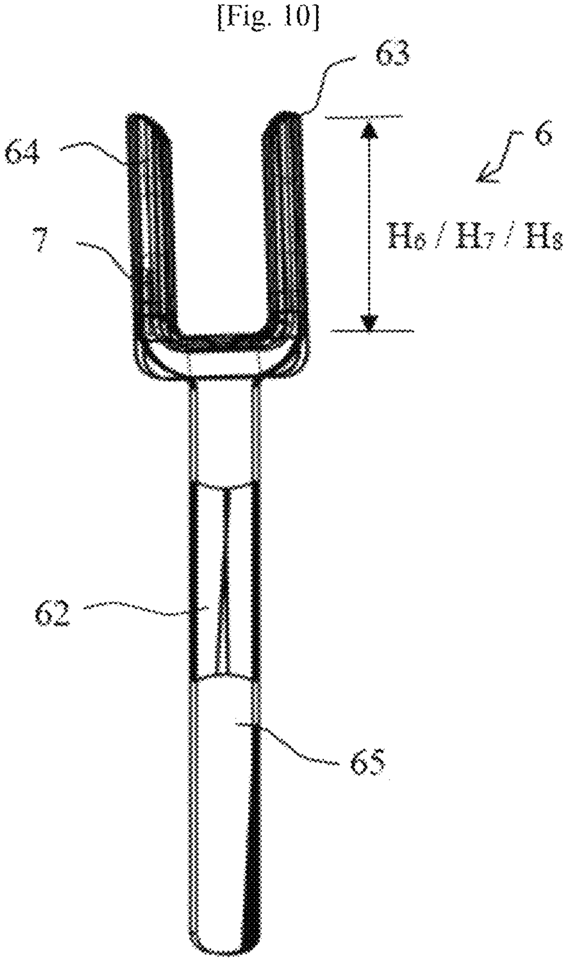

[Fig. 11]
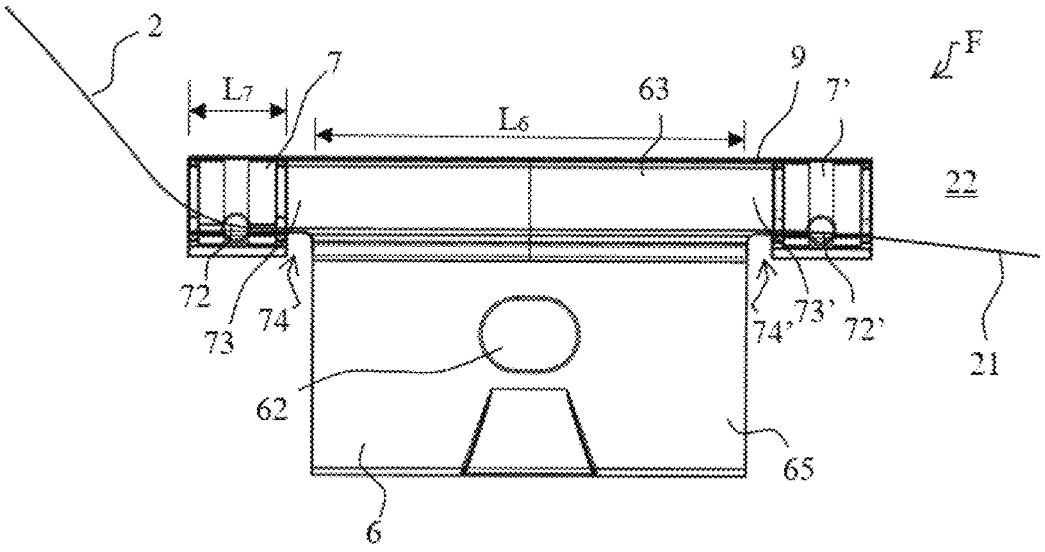
[Fig. 12]
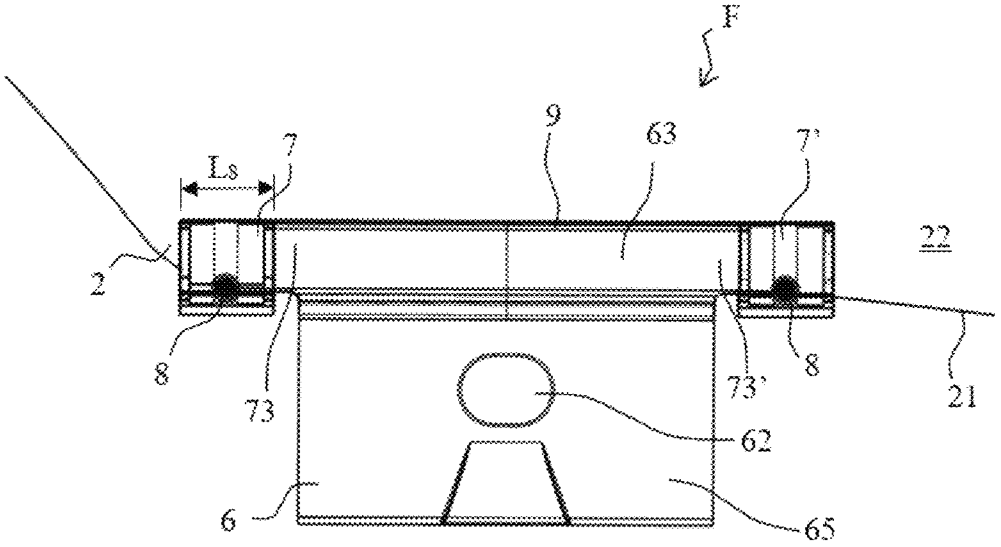

METHOD FOR MANUFACTURING A SLIDING GLAZING UNIT, AND SLIDING GLAZING UNIT

CROSS-REFERENCE TO RELATED APPLICATIONS

This application is the U.S. National Stage of PCT/FR2022/050800, filed Apr. 27, 2022, which in turn claims priority to French patent application number 2104862 filed May 7, 2021. The content of these applications are incorporated herein by reference in their entireties.

The present invention relates to a method for manufacturing a vehicle glazed unit, and in particular of a motor vehicle, including a glass pane as well as means for enabling the mobility of said glass pane in vertical translation with respect to a door of said vehicle.

The present invention also relates to a glazed unit manufactured by this method.

The present invention has been developed in particular for a door without a glazed unit frame, that is, for a door that supports the lower part of the glazed unit but that does not include a lateral jamb or a top jamb.

Many solutions have been developed to allow the vertical mobility of a glazed unit with respect to the door. However, until now, very few solutions have allowed very large control of the lateral attachment tolerance, that is, the tolerance in the exterior-interior direction (that is, the tolerance according to the general direction of the Y-axis of the vehicle).

International patent application No. WO2008074819 teaches in particular that it is possible to use two different adhesive materials to attach a glass pane to a means for allowing the mobility of the glass pane in slot translation. The second adhesive is applied in liquid form by being laterally contained by the first adhesive.

This solution is restrictive to implement due to the liquid state of the second adhesive. It can only be implemented by orienting the glazed unit vertically, in reverse, with the bottom part of the glazed unit at the top. This vertical orientation complicates the proper positioning of the glass pane in the reference frame of the reference housing, since it is then possible to use gravity only for referencing along the Z-axis of the glazed unit.

In contrast, positioning the glass pane horizontally would allow gravity to be used for referencing along the Z- and Y-axes, but this is not compatible with the liquid state of the second adhesive.

The present invention intends to propose a manufacturing method for which, contrary to the prior art, the spatial orientation of the glass pane during the attachment of the means allowing its mobility is not important.

The present invention intends to propose a manufacturing method for which the precision of the attachment of the means allowing mobility of the glass pane is very high, in particular along the Y-axis of the vehicle; a tolerance of plus or minus 0.5 mm along the Y-axis may be obtained owing to the present invention on the final glazed unit while before the attachment of the window holder it is possible for there to be significant play, of the order of 1.5 to 2 mm, between the window holder and an opposite face of the glass pane.

The present invention is based on the idea of very quickly creating a mechanical setting of the window holder next to the U-shaped part, and preferably on each side of the U-shaped part, when the window holder is positioned in the appropriate position relative to the glass pane, this prior mechanical wedging allowing the slow use of the chemical attachment of the window holder to the glass pane by the usual adhesive.

The present invention further aims to propose a method for manufacturing glazed units in series with a single adhesive material that is faster than previously, in particular a method for which it is not necessary to wait for the polymerization, drying or complete hardening of the adhesive in order to remove the glazed unit from the reference housing that is used for the attachment of the means allowing mobility of the glass pane.

The present invention aims to propose a glazed unit whose means allowing its mobility are attached in a more precise manner and which further has been less expensive to manufacture, since it is manufactured more quickly.

The present invention thus relates, in its broadest sense, to a method of making a vehicle glazed unit according to claim 1. This glazed unit includes a glass pane having an external face, an internal face and a peripheral edge, as well as attachment means for allowing the mobility of said glass pane in vertical translation with respect to a door of said vehicle, said attachment means being located in at least one attachment zone and including a window holder having a U-shaped part. According to this method, said attachment means are attached to said glass pane by implementing at least the following steps:

said glass pane is positioned on a reference housing, then, an adhesive is applied and said window holder is positioned opposite a rim of said glass pane such that said adhesive is positioned in said U-shaped part, between at least said glass pane and said window holder, and said window holder having at least one, and preferably several, lateral extension(s), distinct from said U-shaped part and located opposite said glass pane, a quick-hardening plastic material is applied:

on at least one, and preferably each, lateral extension, and/or under at least one, and preferably each, lateral extension.

Thus, said quick-hardening plastic material produces, as soon as it has hardened, a mechanical wedging of the position of the window holder with respect to said glass pane. It is not necessary, nor desired, for said quick-hardening plastic material to adhere chemically to said lateral extension and to said glass pane.

When an adhesive is applied and said window holder is positioned opposite a rim of said glass pane such that said adhesive is positioned in said U-shaped part, between at least said glass pane and said window holder, it is possible:

1—that the adhesive is applied in the form of a cord, extruded for example by a gun, in the free opening of the U-shaped part, then that said window holder is positioned opposite the rim of said glass pane; or 2—that the adhesive is applied in the form of a layer, extruded for example by a gun, in the attachment zone of said glass pane, on one or more faces of said glass pane and/or on its edge, and then that said window holder is positioned facing the rim of said glass pane; or 3—that said window holder is first positioned opposite the rim of said glass pane, then that the adhesive is applied in the form of a cord, extruded for example by a gun in the U-shaped part through the wall of said window holder.

Preferably, in the first two cases above, said quick-hardening plastic material is applied after the application of said adhesive.

Preferably, in the third case above, said quick-hardening plastic material is applied at the same time as said adhesive, in the sense that the two applications have a common duration, in order to reduce manufacturing cycle times (it is possible that one application begins after the other starts and/or that one application finishes after the other ends, but they have a common duration).

Preferably, in the third case above, for better distribution of the adhesive in the U-shaped part, the application of the adhesive through the wall of said window holder is carried out facing the edge of said glass pane.

After its application, said adhesive is in the form of a layer, located between the glass pane and the U-shaped part of the window holder.

Said quick-hardening plastic material hardens, preferably, in a maximum of 60 seconds. Preferably, it is not a layer of a continuous thickness but a cluster of material of fluctuating thickness.

Preferably, the glazed unit is removed from the reference housing only after hardening of said quick-hardening plastic material so that the attachment is reliable.

Said quick-hardening plastic material is preferably a thermoplastic or thermosetting material and preferably has a hardness of at least 60 Shore A in the hardened state.

Said quick-hardening plastic material, preferably, is not present inside said U-shaped part of the window holder; it is preferably applied solely:

- on at least one, and preferably each, lateral extension, and/or
- under at least one, and preferably each, lateral extension.

It is preferable for said adhesive not to extend on or under a lateral extension in order to retain the entire lateral extension for the adhesion between said quick-hardening plastic material and said glass pane. A lateral extension is thus, preferably, a part of the window holder that is opposite the glass pane, which is distinct from a central U-shaped part, and which does not include any adhesive. Preferably, there is a joining part which is not U-shaped, such as for example one or two arms or one or two connecting plates, between a central U-shaped part and a lateral extension.

Said adhesive is preferably present after application only inside said U-shaped part.

However, it may be provided that the quantity of adhesive is such that it overflows laterally; in this case, preferably, each lateral extension is connected to said U-shaped part by a connecting arm or by a connecting plate so that the adhesive protrudes near or in contact with this connecting arm or this connecting plate.

Said quick-hardening plastic material and said adhesive can be in contact with one another; the quick-hardening plastic material can in particular cover surplus adhesive escaping from the U shape in order to bond this surplus.

For better attachment of the quick-hardening plastic material, at least one application of the quick-hardening plastic material, and preferably each application of the quick-hardening plastic material, is preferably carried out facing the edge of said glass pane.

Said applications (of said quick-hardening plastic material and of the totality of said adhesive) are preferably done in said reference housing: preferably without moving the glass pane between the injections, in order to allow attachment that is as fast and as reliable as possible. For the manufacture of the glazed unit, said glass pane is thus, preferably, removed from the reference housing after the application of all of said quick-hardening plastic material and all of said adhesive.

Said quick-hardening plastic material is preferably in contact with the external face, the internal face and the edge of said glass pane.

In order to lighten the glazed unit before it is mounted in the door, it is possible that after drying, hardening or polymerization of said adhesive, at least one, and preferably each, lateral extension, as well as the quick-hardening plastic material, are removed from the glazed unit.

Said adhesive is preferably in contact with the external face, the internal face and the edge of said glass pane.

Said glass pane can be monolithic, completely laminated or partially laminated.

Said glass pane can be partially laminated, with in a laminated part at least one exterior glass sheet, an interior glass sheet, as well as an adhesive material sheet located between said exterior glass sheet and said interior glass sheet, said attachment zone, and preferably each attachment zone, not being laminated.

The glass pane is preferably a partially laminated glass pane in the sense that there is no gas-filled space or vacuum space between the sheets that constitute the glass pane.

Advantageously, the thickness of said exterior glass sheet is between 2.85 mm and 4.85 mm.

Advantageously, the thickness of said interior glass sheet is between 0.30 mm and 2.60 mm.

In a preferred embodiment of the present invention, the thickness of said interior glass sheet is between 1.00 mm and 1.20 mm.

Advantageously, said interior glass sheet has surface stresses at most of 20 MPa, 30 MPa and 40 MPa, respectively, for a thickness of said interior glass sheet of about 1.1 mm, about 1.6 mm and about 2.1 mm. The term "about" here refers to a value considered by the person skilled in the art as a standard value, even if locally this value can vary within a range of plus or minus 10%.

At least one, and preferably each, application of the quick-hardening plastic material is carried out through said lateral extension by a hole.

Said means for enabling the mobility of said glass pane may comprise, within the meaning of the present invention, a window holder or a holder, or rails, or runners.

Said means for allowing the mobility of said glass pane preferably do not comprise holes passing partially or completely through said glass pane (that is, over a part of the thickness of a component element thereof or the totality of the thickness of this element or over a part of the thickness of the glass pane comprising several elements in this location, or even over the totality of the thickness of the glass pane).

The present invention also relates to a vehicle glazed unit, in particular obtained by implementing the manufacturing method according to the invention, said glazed unit including a glass pane having an external face, an internal face and a peripheral edge, as well as attachment means for allowing the mobility of said glass pane in vertical translation with respect to a door of said vehicle, said attachment means being located in at least one attachment zone and including a window holder having a U-shaped part, said glazed unit being remarkable in that:

- an adhesive is present opposite a rim of said glass pane such that said adhesive is positioned in said U-shaped part, between at least said glass pane and said window holder, and
- said window holder having at least one, and preferably several, lateral extension(s), distinct from said U-shaped part and located opposite said glass pane, a quick-hardening plastic material is present:

on at least one, and preferably each, lateral extension, and/or under at least one, and preferably each, lateral extension.

Preferably, at least one, and preferably each, lateral extension includes at least one hole.

In a first variant, said lateral extension is in the form of a plate in contact with a face of said glass pane, or nearby.

In a second variant, said lateral extension is in the form of a lateral U, preferably of cross section identical to said central U-shaped part, clasping a rim of said glass pane; said lateral U shape clasps a rim of said glass pane, preferably at a distance from the faces and the edge of the glass pane, but a wall of the lateral U shape may optionally be in contact with a face or the edge of said glass pane, depending on the shape of the glass pane.

Preferably, at least one, and preferably each, lateral extension is connected to said U-shaped part by a connecting arm (relatively thin) or by a connecting plate (relatively high); this connection preferably extends further from the glass pane than the lateral extension if the lateral extension is in contact with said glass pane, or extends further from the glass pane at the same distance as the lateral extension if the lateral extension is at a distance from said glass pane.

In the present document, when it is explained that a central or lateral part or U shape clasps a rim of the glass pane, it should be understood that the inside of the part or U shape follows the general shape of the two opposite faces and the edge of the glass pane; there is no complete contact of the entire part or U shape with the two opposite faces and the edge of the glass pane because there is a space between them for the adhesive or the quick-hardening plastic material.

In the present document, for the mentioned ranges, the limits of the ranges are included in the ranges.

The expression "edge" or "end face" designates the narrow side of a sheet, which is located substantially transversely between the two main faces of a sheet.

Thus, the method for manufacturing the glazed unit according to the invention is easier to implement because the glass pane can be held in the reference housing in any position, and in particular in the most suitable position with respect to gravity while being faster to implement since it is not necessary to wait for the polymerization or the drying or the complete hardening of the adhesive to remove the glazed unit from the reference housing; it is sufficient to wait for the hardening of the quick-hardening plastic material.

The present invention has been developed for glazed units incorporated in doors not having lateral jambs or an upper jamb at the glazed unit when the latter is raised (closed).

Advantageously, especially, the present invention enables production of a glazed unit with means allowing its mobility which are attached to the glass pane with very high precision, in particular along the Y-axis, and very high reliability, while being light.

The present invention will be better understood from reading the detailed description hereinafter of non-limiting exemplary embodiments and from the appended figures:

FIG. 1 shows an interior front view of a monolithic front movable vehicle glazed unit according to one embodiment of the invention with a single window holder;

FIG. 2 shows a schematic perspective view of a reference housing at the beginning of the manufacturing method according to the invention;

FIG. 3 shows another perspective view of the reference housing during the referencing of the window holder;

FIG. 4 shows a perspective view of a window holder according to a first alternative embodiment;

FIG. 5 shows the window holder of [FIG. 4] with a bead of adhesive;

FIG. 6 shows a partial perspective view of the bonding of the window holder of [FIG. 4];

FIG. 7 shows a partial perspective view of the window holder of [FIG. 6] with in addition a quick-hardening plastic material;

FIG. 8 shows a partial side view of [FIG. 7];

FIG. 9 shows a perspective view of a window holder according to a first alternative embodiment;

FIG. 10 shows a side view of [FIG. 9];

FIG. 11 shows a partial top view of the bonding of the window holder of [FIG. 9]; and FIG. 12 shows a partial top view of the adhesive bonding of the window holder of [FIG. 11] with in addition a quick-hardening plastic material.

It is noted that the proportions between the various elements shown in the figures have been respected for each figure independently, in order to facilitate the reading thereof.

[FIG. 1] shows a left side glazed unit 1 of a vehicle, according to one embodiment of the invention, considered as being seen from the interior of this vehicle.

It is in particular a lateral glazed unit of a door of a motor vehicle (not visible in [FIG. 1]) that can be moved in translation with respect to this door substantially according to the vertical between an open position wherein the glazed unit is located entirely or almost entirely in the interior of the door and a closed position wherein the glazed unit closes a glass pane opening of the door.

Thus, in a closed position, this glazed unit embodies a vertical separation between an interior space I that is in the interior of the vehicle and an exterior space E that is on the exterior of the vehicle.

The notions "exterior" and "interior" are therefore respectively considered in the present document with respect to this exterior space E and this interior space I.

As it concerns a lateral glazed unit, the latter for the most part extends according to the axis generally referred to as the "X-axis" of the vehicle, which is the central longitudinal axis of the advance of the vehicle equipped with the glazed unit according to the invention as a lateral glazed unit on the left side of the vehicle and which corresponds to the horizontal axis in the plane of the sheet in [FIG. 1].

The mobility of the glazed unit relative to the door is essentially vertical in the sense that this mobility takes place along the Z-axis, optionally with a small component along the transverse axis Y not shown in [FIG. 1].

In the embodiments shown, the glazed unit 1 is in one piece.

In [FIG. 1], the glazed unit 1 includes a glass pane 2 which is monolithic and curved (that is, not flat): it consists of a single sheet of glass or plastic material, preferably glass.

The glass pane 2 could be more complex: curved and laminated, or even curved and partially laminated.

[FIG. 1] shows that the glass pane 2 therefore has an external face 20 oriented toward the exterior space E, an internal face 22 oriented toward the interior space I, and a peripheral edge 21 situated between these two faces.

The glass pane 2 has a first lateral rim 23, a second lateral rim 24, a top rim 25 and a bottom rim 26. The first lateral rim 23 and the second lateral rim 24 of the glass pane are arranged respectively in the part of the glass pane oriented toward the front and in the part of the glass pane oriented toward the rear of the vehicle. The top rim 25 and the bottom rim 26 of the glass pane are arranged in the part of the glass pane oriented toward the roof and in the part of the glass pane oriented toward the ground on which the vehicle rests.

If the glass pane 2 is partially laminated, it includes a main part that is laminated and in this laminated part, the glass pane includes, from the exterior to the interior, at least, in this order: an exterior glass sheet, an adhesive interlayer then an interior glass sheet; however, it is possible for at least one other sheet to be inserted between the exterior glass sheet and the adhesive interlayer or between the adhesive interlayer and the interior glass sheet.

The exterior glass sheet may be a glass sheet having undergone a hot-bending operation before the manufacture of the partially laminated glass pane having a thickness between 2.85 and 4.85 mm, for example 3.50 mm. The exterior glass sheet may have surface stresses of at least 80 MPa while being less than 200 MPa.

The interior glass sheet may be a glass sheet having undergone a thermal tempering or semi-tempering operation and having a thickness between 0.70 and 2.60 mm, or even between 0.70 and 2.50 mm, or even between 0.70 and 2.30 mm, or even between 0.70 and 2.10 mm, for example 1.10 mm or 1.60 mm. The tempering or semi-tempering operations have the advantage of being very rapid to perform. Indeed, on average, approximately 20 sheets of glass can be produced in one minute. Furthermore, the tempering or semi-tempering operation allows surface stresses to be introduced in the order of 20 MPa, 30 MPa and 40 MPa, respectively, on a glass sheet having a thickness of about 1.10 mm, about 1.60 mm and about 2.10 mm.

In a variant, the interior glass sheet may be a glass sheet having undergone a chemical tempering operation and having a thickness between 0.30 and 1.60 mm, or even between 0.50 and 1.50 mm, or even between 0.70 and 1.20 mm, for example 1.10 mm. A chemical tempering operation allows surface stresses of at least 200 MPa to be introduced.

The adhesive material interlayer is for example a sheet made of polyvinyl butyral (PVB) having a thickness comprised between 0.30 and 1.50 mm, for example of 0.78 mm. This adhesive material sheet preferably has the same length dimension according to the X-axis and height dimension according to the Z-axis as the interior glass sheet.

In the case where the glass pane includes one or more other sheets in addition to the three mentioned previously, the exterior glass sheet is the outermost sheet of the laminated glass pane.

In [FIG. 1], the dashed line, called "line of sight" or "limit of sight" VL, shows the top of the shell of the door inside which the glazed unit 1 slides. When the glazed unit is considered vertically, this line of sight VL creates a separation between, on the one hand, a hidden part of the glass pane HP that is located below the line of sight VL and that is intended to be hidden inside the door regardless of the position of the glass pane relative to said door and, on the other hand, a visible part of the glass pane VP that is located above the line of sight VL.

In the hidden part of the glazed unit, under the line VL, the glazed unit has one, or even two, attachment zones F, each zone being intended to accommodate means for allowing the mobility of the glass pane in vertical translation with respect to a door of the vehicle. In the finished glazed unit, each attachment zone F includes a window holder 6 that is attached to the glass pane, as explained in more detail below.

The glazed unit thus includes, in addition to the glass pane 2, along at least part of at least one bottom rim 26, at least one window holder 6 that is intended to accommodate a securing element, not shown, which has the purpose of allowing the window holder to be attached in a movement system to raise and lower the glazed unit. On this subject, some documents talk of a "regulator" system.

The glazed unit, in its usage configuration, here includes a single window holder.

In the partially laminated glass pane configuration, each attachment zone F is not laminated in the totality of the zone: at least one of the three elements which at least partially compose the lamination in the laminated part is not present in the totality of this (or these) attachment zone(s).

To produce a non-laminated attachment zone, the bottom rim of the interior glass sheet, as well as the bottom rim of the adhesive material sheet, are much higher than the bottom rim of the exterior glass sheet. The bottom rim of the interior glass sheet and the bottom rim are located approximately midway along the vertical between the line of sight VL and the bottom rim of the exterior glass sheet.

Preferably, no attachment zone F of the glazed unit includes an attachment hole.

The window holder 6 substantially has, in cross section, a U shape that clasps a longitudinal part of the bottom rim 26, without being in contact itself with the glass pane 2.

In the embodiment shown here, the means for allowing the mobility of the glass pane 2 in translation relative to a door of the vehicle comprise at least one window holder 6 substantially having, in cross section, an inverted h shape or a tuning fork shape, that is, a U shape with a tail that extends opposite the two lateral walls of the U-shaped part.

The (or each) window holder may be made of plastic, for example polyamide, polybutylene terephthalate, or metal alloy, for example aluminum alloy.

This window holder 6 thus has:

- a first part consisting of two parallel walls 63, 64 that are connected at their base and forming a longitudinal groove, that is, forming a U shape in transverse cross section, and
- a second part consisting of a tail 65, or a foot, extending opposite from the walls 63, 64 with respect to the base connecting these walls.

The tail 65 is intended to be connected to a motorized driving system, which is not shown, in order to allow the glazed unit 1 to be raised and lowered in the door of the vehicle. This h shape of the window holder is particularly advantageous because it allows the transmission of forces between the window holder and the glass pane along a large area corresponding to the sum of the interior surfaces of the walls 63, 64.

The assembly is performed so that said walls 63, 64 of said h shape clasp the lower part of said glass pane 2, the tail 65 then being located substantially in the projection of the glass pane 2.

The assembly of the window holder and the glass pane 2 is performed on a reference housing 10 allowing tolerances on the window holder/glass pane assembly to be controlled.

Before positioning and attaching the window holders, in a first step, the glass pane is correctly positioned ("focused") in a mounting template having a plurality of positioning stops Y1, Y2, Y3, Y4 which represent the nominal shape plane of the glass pane on the vehicle.

The positioning stops that are essentially along the Y-axis: Y1, Y2, Y3, Y4, are located on vertical jambs, respectively RY1, RY2, RY3, RY4.

Once the glass pane 2 is correctly positioned and held in the reference housing 10, as shown in [FIG. 2], an operator or the articulated arm of a robot proceeds with the second step of the method, also visible in [FIG. 2]: the window holder 6 is positioned facing the rim of the glass pane 2 and a bead of adhesive 9 is applied and such that said adhesive 9 is positioned in the U-shaped part, between the glass pane 2 and the window holder 6, in the form of a layer of adhesive, for example.

In order for the adhesive to be properly located in the U-shaped part, it is possible, for example, to place a bead of adhesive 9 on the opening of the U-shaped part before the part is inserted onto the rim of the glass pane, as can be seen in [FIG. 4], the content of which is detailed below.

As a variant or in addition, it is possible to apply the adhesive 9 to one or more faces of the glass pane 2, or even on its edge 21, before the U-shaped part is clasped on the rim of the glass pane.

As a variant or in addition, it is possible first to clasp the U-shaped part on the rim of the glass pane and then to apply the adhesive 9 in the U-shaped part through the wall of the window holder through at least one hole (not shown), preferably located facing the edge of the glass pane.

[FIG. 3] shows, with double arrow A, the appropriate positioning of the window holder 6, carried by a window holder guide device 60, in the housing 10 such that the U-shaped part clasps the rim of the glass pane, with the adhesive 9 between this U-shaped part and the glass pane 2.

The window holder 6 according to the invention has at least one, and preferably several, lateral extension(s) 7*a*, 7*b*, 7*c*, 7*d*; 7, 7', distinct from said U-shaped part.

Two window holder configurations are described in detail below.

In a first variant, shown in [FIG. 4] to [FIG. 8], the window holder 6 has several lateral extension(s) 7*a*, 7*b*, 7*c*, 7*d*, distinct from said U-shaped part and each being in the form of a plate 70 intended to be in contact with a face of the glass pane 2 or close to this face, this plate being connected to the U-shaped part by two horizontal connecting arms 71, 71' (along the Z-axis).

Each lateral extension 7*a*, 7*b*, 7*c*, 7*d* here further includes a hole 72*a*, 72*b*, 72*c*, 72*d*, respectively.

In the version shown, the window holder includes four lateral extensions 7*a*, 7*b*, 7*c*, 7*d*: two lateral extensions 7*a*, 7*b* in contact with the internal face 22, one located on the left and the other on the right of the U-shaped part, and two lateral extensions 7*c*, 7*d* in contact with the external face 20, one located on the left and the other on the right of the U-shaped part. No lateral extension is in contact with the edge 21 of the glass pane 2.

The four lateral extensions are of identical general shape and the extensions located on the left and on the right of the U-shaped part are symmetrical to one another relative to a vertical axis.

Each extension has a length $L_7$, along the X-axis, which is between 1/20 and 1/5 of the length $L_6$ of the U-shaped portion; here, the length $L_7$ is about 1/10 of the length $L_6$ of the U-shaped part.

Each extension has a height $H_7$, along the Z-axis, which is between 1/2 and 9/10 of the height $H_6$ of the U-shaped part which is opposite the internal face 22 or the external face 20; here, the height $H_7$ is about 8/10 of the height $H_6$. The extensions do not extend higher than the U-shaped part, and do not extend to the edge surface between the face 20 or 22 and the edge 21, with the aim of leaving the free surface of the face 20, 22 on the one hand between the top of the extension and the line of sight VL and on the other hand between the bottom of the extension and the edge surface between the face 20 or 22 and the edge 21.

In a second variant, shown in [FIG. 9] to [FIG. 12], the window holder 6 has several lateral extension(s) 7, 7', distinct from said U-shaped part and each in the form of a lateral U, seen in transverse cross section, of cross section identical to the central U-shaped part. Each lateral extension is intended to clasp the rim of the glass pane 2, at a distance from the faces 20, 22 and the edge 21 of the glass pane 2.

Each lateral extension 7, 7' here further includes a hole 72, 72' located opposite the internal face 22.

In the version shown, the window holder includes two lateral extensions 7, one located on the left and the other on the right of the central U-shaped part The two lateral extensions are of identical general shape and are symmetrical to one another relative to a vertical axis. The lateral extensions 7, 7' are connected to the wall 63 of the central U-shaped part by horizontal connecting plates 73, 73' (along the Z-axis) located in the lateral extension of this wall 63 and are connected to the wall 64 of the central U-shaped part by horizontal connecting plates (along the Z-axis) located in the lateral extension of this wall 64.

Each extension has a length $L_7$, along the X-axis, which is between 1/20 and 1/5 of the length $L_6$ of the U-shaped portion; here, the length $L_7$ is about 1/10 of the length $L_6$ of the U-shaped part.

Each extension has a height $H_7$, along the Z-axis, which is between 1/2 and 9/10 of the height $H_6$ of the U-shaped part which is opposite the internal face 22 or the external face 20; here, the height $H_7$ is identical to the height $H_6$. The extensions do not extend higher than the central U-shaped part, and do not extend lower than the central U-shaped part, with the aim of having the largest possible free surface opposite the faces 20, 22 and the edge 21.

In both variants, the extensions are preferably made of the same material as the U-shaped part; they are preferably integral with the U-shaped part.

[FIG. 6] and [FIG. 11] thus each show a detail view of [FIG. 3] for each of the two window holder variants 6.

This positioning is the final positioning that is desired in the final glazed unit.

After the appropriate step of positioning the window holder 6 visible in [FIG. 6] and [FIG. 11], the position of the window holder is fixed during the implementation of a third step: a quick-hardening plastic 8 is applied:

- on at least one, and preferably each, lateral extension 7*a*, 7*b*, 7*c*, 7*d*, as visible in [FIG. 7] and [FIG. 8] for the first variant, or
- under at least one, and preferably each, lateral extension 7, 7', as visible in [FIG. 12] for the second variant.

Due to the geometric deviations of the glass panes 2 of the same series in the attachment zone F, the thickness of the adhesive 9 is not uniform from one glazed unit to the other of a same series and varies based on the actual geometry of each glass pane in the attachment zone. The quick-hardening adhesive material 8 allows fixing of the specific position of the window holder and of the glass pane, which may be different for each glazed unit of a same series, in the time that the adhesive 9 performs chemical adhesion between the window holder and the glass pane.

The quick-hardening adhesive material 8 in particular allows fixing of the position according to the Y-axis with very high precision, taking into consideration that the shape of the glass pane itself according to this Y-axis varies from one glass pane to the other for the same series of glazed units.

When the quick-hardening plastic material 8 is applied to a lateral extension 7*a*, 7*b*, 7*c*, 7*d*, this material preferably completely covers the plate 71 and protrudes above, below and on the sides of the plate 71 in order to fix the position of the lateral extension 7*a*, 7*b*, 7*c*, 7*d* with respect to the face 20 or 22 of the glass pane 2. If a hole 72*a*, 72*b*, 72*c*, 72*d* is present, the quick-hardening plastic material 8 penetrates into the hole so as to come into contact with the face 20 or 22 of the glass pane 2 and thus increase the precision of the wedging of the position of the lateral extension 7*a*, 7*b*, 7*c*, 7*d* with respect to the face 20 or 22.

For each lateral extension 7*a*, 7*b*, 7*c*, 7*d*, the quick-hardening plastic material 8 can be applied so that it clasps a rim of the glass pane 2: each application of quick-hardening plastic material 8 is then applied and adhered against the external face 20, against the edge 21 and against the internal face 22 in the attachment zone.

Each application of quick-hardening plastic material 8 is preferably a single piece because the strength of the wedging is thus stronger.

Each application of quick-hardening plastic material 8 here has a length $L_8$ (according to the X-axis) greater than the length $L_7$ of the lateral extensions 7*a*, 7*b*, 7*c*, 7*d* covered: the quick-hardening plastic material 8 overflows laterally beyond the lateral extensions 7*a*, 7*b*, 7*c*, 7*d*.

When the quick-hardening plastic material 8 is applied under a lateral extension 7, 7', this material preferably penetrates thoroughly between on the one hand the faces 20 and 22 of the glass pane 2, as well as its edge 21, and on the other hand the lateral extension 7, 7' in order to fix the position of the extension of the lateral extension 7, 7' with respect to the glass pane 2. If a hole 72, 72' is present, the quick-hardening plastic material 8 penetrates into the hole so as to come into contact with the face 20 or 22 of the glass pane 2 and thus increase the precision of the wedging of the position of the lateral extension 7, 7' with respect to both the face 20 and the face 22.

If a hole 72, 72' is present, the application of the quick-hardening plastic material 8 is preferably carried out through the wall of the lateral extension 7, 7', by the hole 72, 72'. These injection holes 80, 80' are located in the bottom of the U shape, in order allow injections to be produced facing the edge 21 of the glass pane 2 and so that the injected material is then distributed correctly in the volume of the U shape.

For each lateral extension 7, 7', the quick-hardening plastic material 8 is applied so that it clasps a rim of the glass pane 2: each application of quick-hardening plastic material 8 is applied against the external face 20, against the edge 21 and against the internal face 22 in the attachment zone.

If the quantity of adhesive 9 is such that it protrudes laterally outside the U-shaped part, the adhesive can protrude near or in contact with the connecting plate 73, 73', in the recess 74, 74'; this will not hinder the adhesion of the plastic material 8 to the lateral extension 70, 70' and furthermore to the glass pane 2.

Each application of quick-hardening plastic material 8 is preferably a single piece because the strength of the wedging is thus stronger.

Each application of quick-hardening plastic material 8 here has a length $L_8$ (along the X-axis) identical to the length $L_7$ of the lateral extensions 7, 7': the quick-hardening plastic material 8 does not protrude laterally outside the lateral extensions 7, 7' to the left or to the right; the quick-hardening plastic material 8 also does not protrude above the lateral extension 7, 7'.

It should be noted that the quick-hardening plastic material 8 can be applied to be both under a lateral extension and on this lateral extension and that this can apply to several lateral extensions, or even to all the lateral extensions of the window holder.

It is also possible that for a window holder, the quick-hardening plastic material 8 is on one or more lateral extension(s) and is under one or more other lateral extension(s). The space available in the door intended to accommodate the glazed unit may influence the choice of the positioning of the quick-hardening plastic material 8 relative to the lateral extensions.

Furthermore, in the same series of glazed units (intended for the same type of vehicle), the quick-hardening plastic material 8 can be applied to be under a lateral extension for certain glazed units of this series and on this lateral extension for other glazed units, since the final position of a window holder depends on the actual configuration of each glass pane.

In the method for manufacturing vehicle glazed units according to the invention, it is therefore possible for the quick-hardening plastic material 8 to be applied:

on one, or several, lateral extension(s) 7*a*, 7*b*, 7*c*, 7*d* for certain glazed units of the series, and under one, or several, lateral extension(s) 7, 7' for other glazed units of the series.

The quick-hardening plastic material 8 may for example be a material hardening in 60 seconds or less. Here, it is a thermoplastic or thermosetting material and it preferably has a hardness of at least 60 Shore A in the hardened state. It may in particular be a thermoplastic elastomer (TPE), a Polyamide, etc. This is in particular a "hotmelt Tecbond 240-12-300" material.

For a window holder, all the applications of the quick-hardening plastic material 8 are preferably carried out at the same time in order to reduce the total duration of the manufacturing method.

The adhesive 9 is for example a thermosetting resin, for example based on polyurethane, mono- or bi-component, with or without accelerator. The hardening time of the adhesive is of little importance, and it may be long because the window holder is already correctly attached to the glass pane by the quick-hardening plastic material 8.

From the first to the third step, the glass pane 2 is held in the reference housing 10 without moving. After the third step, once the application of the quick-hardening plastic material 8 is finished and the quick-hardening plastic material 8 is sufficiently hard (not necessarily completely hard), the glazed unit 1 can be immediately removed from the reference housing 10; it is not necessary to wait for the polymerization or the hardening of the adhesive 9.

Advantageously, there is no upper boundary (along the Z-axis) for the materials applied. Monitoring the application and the amount applied is sufficient to control that all of the application spaces are filled with the materials to be applied.

Thus, the physical wedging of the window holder to the glass pane 2 by the plastic material 8 is done quickly and is reliable: the chemical attachment by the adhesive 9 can be done without risk of the window holder moving towards the glass pane. This chemical attachment is reliable and precise; it is not necessary to complement it with a mechanical attachment of the window holder to the glass pane.

Although this is not desired because it adds an additional step, it is possible to provide for a window holder, and in particular its tail 65, to be subsequently retouched, such that its configuration is modified, as taught for example in international patent application No. WO200598187.

To lighten the glazed unit 1, once the adhesive 9 is dry or hard or polymerized, it is possible that one, several, and preferably each, lateral extension 7*a*, 7*b*, 7*c*, 7*d*; 7, 7' as well as the quick-hardening plastic material 8 are removed from the glazed unit 1 before it is mounted in the door.

Above the limit of sight VL, the door of the vehicle may include at least one part with no jamb. Thus, it is possible for the door:

to not include a front lateral jamb and for it to be the adjacent body part, also called "A-pillar," that guides the glazed unit, and/or to not include a rear lateral jamb and for it to be the adjacent body part, also called "B-pillar," that guides the glazed unit.

The present invention is described in the preceding text by way of example. Of course, those skilled in the art are capable of implementing different variants of the invention without departing from the scope of the patent such as defined by the claims.

The invention claimed is:

1. A method for manufacturing a vehicle glazed unit, including a glass pane having an external face, an internal face and a peripheral edge, as well as an attachment system configured to allow mobility of said glass pane in vertical translation with respect to a door of a vehicle, said attachment system being located in at least one attachment zone and including a window holder having a U-shaped part, wherein said attachment system is attached to said glass pane by implementing at least the following acts:

positioning said glass pane on a reference housing, then, applying an adhesive and positioning said window holder opposite a rim of said glass pane such that said adhesive is positioned in said U-shaped part, between at least said glass pane and said window holder, said window holder having at least one lateral extension, distinct from said U-shaped part and located opposite said glass pane, wherein the at least one lateral extension provides a pair of clasping parts on opposing face surfaces of the glass pane on at least one lateral side of the U-shaped part, and applying a quick-hardening plastic material:

on the at least one lateral extension, including said clasping parts, or under the at least one lateral extension, including said clasping parts, or both;

wherein the quick-hardening plastic material hardens to mechanically secure the glass pane between the clasping parts provided by the at least one lateral extension and fix the U-shaped part to the glass pane independently of a state of the adhesive.

2. The method according to claim 1, wherein said quick-hardening plastic material is applied after the application of said adhesive.

3. The method according to claim 1, wherein said quick-hardening plastic material is a thermoplastic or thermosetting material.

4. The method according to claim 3, wherein said quick-hardening plastic material has a hardness of at least 60 Shore A in the hardened state.

5. The method according to claim 1, wherein at least one application of the quick-hardening plastic material is carried out on the peripheral edge of said glass pane.

6. The method according to claim 1, wherein said applications are carried out in said reference housing.

7. The method according to claim 1, wherein after the application of said quick-hardening plastic material, the quick-hardening plastic material is in contact with the external face, the internal face and the peripheral edge of said glass pane.

8. The method according to claim 1, wherein after drying, hardening or polymerization of said adhesive, at least one lateral extension, as well as the quick-hardening plastic material, are removed from the glazed unit.

9. The method according to claim 1, wherein said adhesive is in contact with the external face, the internal face and the peripheral edge of said glass pane.

10. The method according to claim 1, wherein said glass pane is partially laminated, within a laminated part at least one exterior glass sheet, an interior glass sheet, as well as an adhesive material sheet located between said exterior glass sheet and said interior glass sheet, each said attachment zone of the at least one attachment zone not being laminated.

11. The method according to claim 10, wherein there are a plurality of attachment zones, each of which is not laminated.

12. The method according to claim 1, wherein at least one application of the quick-hardening plastic material is carried out through said lateral extension by a hole.

13. The method according to claim 1, wherein said window holder has a plurality of lateral extensions distinct from said U-shaped part and located opposite said glass pane.

14. The method according to claim 13, wherein the quick-hardening plastic material is applied on each lateral extension, or under each lateral extension, or both.

15. The method according to claim 13, wherein each application of the quick-hardening plastic material is carried out on the peripheral edge of said glass pane.

16. The method according to claim 13, wherein after drying, hardening or polymerization of said adhesive, each lateral extension, as well as the quick-hardening plastic material, are removed from the glazed unit.

17. The method of claim 1, wherein the quick hardening plastic material is not present inside the U-shaped part.

18. The method of claim 1, wherein the glazing unit is removed from the housing after hardening of the quick-hardening plastic material.

19. The method of claim 1, wherein the at least one lateral extension comprises a pair of separate lateral extensions on one lateral side of the U-shaped part, wherein the pair of separate lateral extensions together provide the pair of clasping parts on said one lateral side of the U-shaped part.

20. The method of claim 19, wherein the at least one lateral extension comprises another pair of separate lateral extensions on the other lateral side of the U-shaped part, wherein the another pair of separate lateral extensions together provide another pair of clasping parts on said other lateral side of the U-shaped part, said application of said quick-hardening plastic material also being applied to said another pair of clasping parts, wherein the quick-hardening plastic material hardens to mechanically secure the glass pane between both pairs of the clasping parts provided and fix the U-shaped part to the glass pane independently of the state of the adhesive.

21. The method of claim 1, wherein the at least one lateral extension comprises a U-shaped lateral extension on one lateral side of the U-shaped part, wherein opposing parts of the lateral extension's U-shape together provide the pair of clasping parts on said one lateral side of the U-shaped part.

22. The method of claim 21, wherein the at least one lateral extension comprises another U-shaped lateral extension on the other lateral side of the U-shaped part, wherein opposing parts of the another lateral extension's U-shape together provide another pair of clasping parts on said other lateral side of the U-shaped part said application of said quick-hardening plastic material also being applied to said another pair of clasping parts, wherein the quick-hardening plastic material hardens to mechanically secure the glass pane between both pairs of the clasping parts provided and fix the U-shaped part to the glass pane independently of the state of the adhesive.

23. The method of claim 1, wherein each clasping part has a hole therethrough and wherein during application of the quick-hardening plastic the quick-hardening plastic flows through the holes to contact the faces of the glass pane for adherence thereto.

* * * * *